United States Patent Office 3,117,345
Patented Jan. 14, 1964

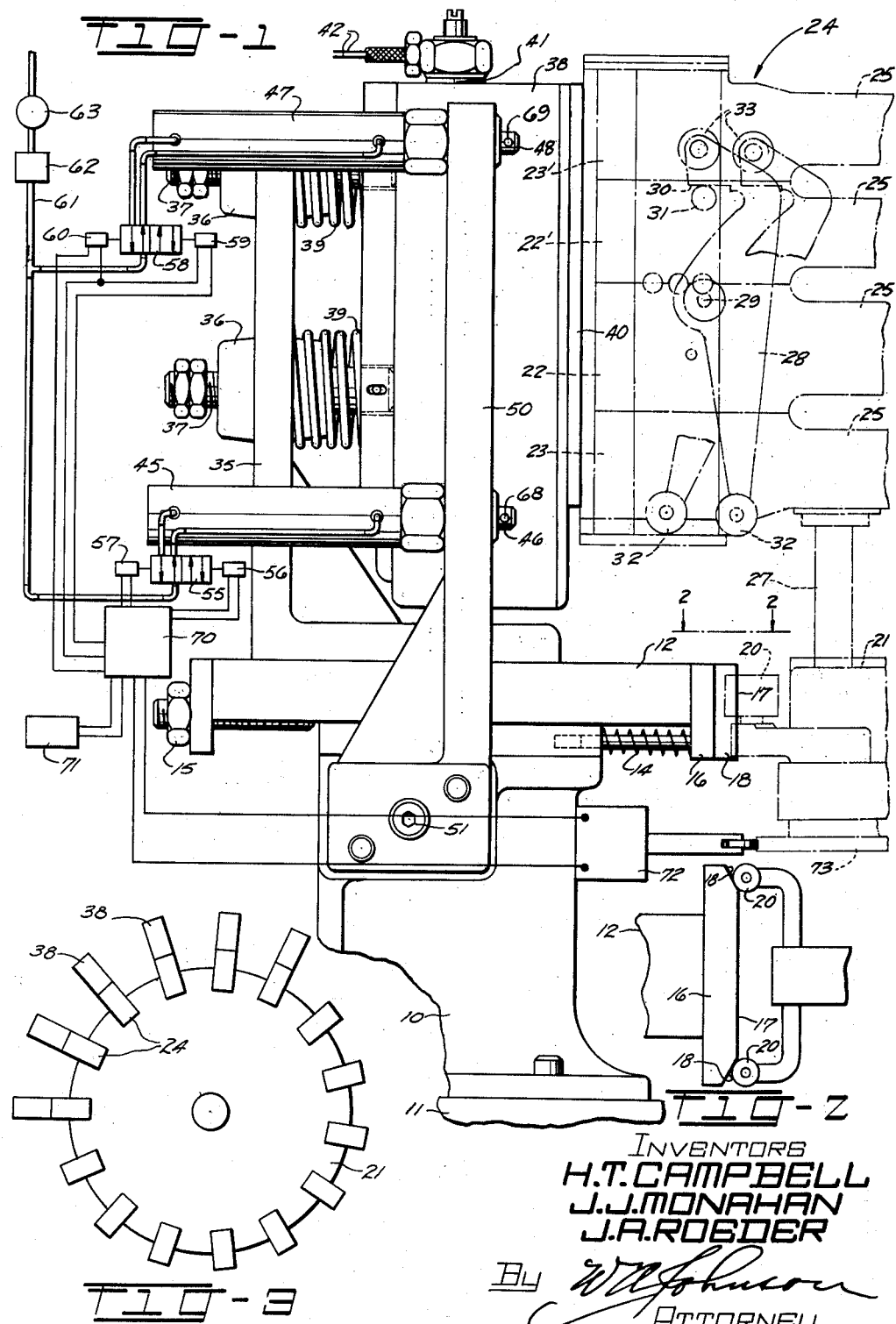

3,117,345
APPARATUS FOR HEATING MOLDS
Hobart T. Campbell and Jack J. Monahan, Allentown, and Joseph A. Roeder, Quakertown, Pa., assignors to Western Electric Company, Incorporated, New York, N.Y., a corporation of New York
Filed Dec. 8, 1961, Ser. No. 157,966
10 Claims. (Cl. 18—20)

This invention relates to apparatus for heating molds, particularly sectional molds moved successively into a heating station.

During the manufacture of certain types of electrical components, the main portions of the components are molded in a dielectric material. In the present instance, the molding operations are performed in a turret type machine, as shown in applicants' co-pending application, Serial No. 157,965, filed December 8, 1961, wherein sectional molds mounted radially on a turret, after receiving the components and the molding material, are moved into a heating station or into a plurality of heating stations where the molds are to be heated sufficiently to complete the molding operations. Furthermore, in the present instance, each mold is provided with a lock carried by one of the mold sections and actuable into and out of locking positions with respect to a pin carried by the other mold section in each instance.

The object of the present invention is an apparatus which is simple in structure and highly efficient in heating sectional molds.

According to the object, the invention includes an apparatus for heating sectional molds moved between intervals of rest into and out of a heating station and having locks movable to lock the sections of the mold closed and to free the sections of the molds to open, the apparatus including a carriage mounted on a support at the heating station and normally movable into mold heating position, yet having a cam on the carriage responsive to a roller on the turret carrying the mold successively into the heating station, to move the heating unit free of the molds prior to their movements into and out of the heating station.

With the apparatus of the turret type disclosed in the aforementioned co-pending application, it may be desirable to have a plurality of heating stations mounted at fixed positions about the turret and that, in some instances, the molds be locked closed at the first heating station and unlocked prior to movement out of the last heating station. Furthermore, if there should be only one heating station, it would be desirable to have the molds locked immediately after entering the heating station and unlocked prior to leaving the heating station.

Other objects and advantages will be apparent from the following detailed description when considered in conjunction with the accompanying drawings wherein:

FIG. 1 is a side elevational view of the apparatus illustrating both locking and unlocking means;

FIG. 2 is a fragmentary sectional view taken along the line 2—2 of FIG. 1; and

FIG. 3 is a schematic illustration of the turret with a plurality of heating stations.

In the present illustration, the apparatus includes a support 10 mounted at a fixed position 11 and having a carriage 12 normally urged to the right by suitable means such as a spring 14 and limited in this movement by an adjustable stop 15 positioned to engage the support 10. A cam 16, of a contour shown particularly in FIG. 2, is mounted on the right end of the carriage 12 and is provided with a high portion 17 interposed between tapered low portions 18. The cam 16 is responsive to leading and trailing cam rollers 20 mounted as shown on a turret 21 which is moved intermittently about its axis between intervals of rest to locate inner members 22 and 22′ and outer members 23 and 23′ of molds, indicated generally at 24, at the heating station.

The mold members are supported by arms 25 which are movable relative to each other by suitable means 27 to locate the mold members in open position and to close the mold members when desired.

A lock 28 pivotally supported at 29 on the mold member 22 has an arcuate surface 30 adapted to engage a pin 31 of the mold member 22′ and perform a camming action on the pin and between the pin and the pivot 29, to forcibly seal and lock the mold members 22 and 22′ in closed positions. Rollers 32 and 33 are mounted, respectively, on the lower and upper ends of the lock 28.

A bracket 35 is mounted on the carriage 12 and has bearings 36 for movably supporting parallel rods 37 on the right ends of which a heating unit 38 is mounted and urged to the right by springs 39 disposed concentric with their rods 37 and interposed between the bracket 35 and the heating unit 38. The heating unit 38 has a member 40 which is to engage the mold members when closed and is electrically heated by an element (not shown) extending into the unit and controlled by a thermocouple 41 connected through lines 42 to a control for the heating means, not shown.

The means for actuating the lock 28 includes an air cylinder 45 with its piston rod 46 movable to engage the roller 32 and move it from its left position to its right position, to move the lock into registration with the pin 31, to lock the mold closed. The means to move the lock into open position includes an air cylinder 47 with a piston rod 48 positioned to engage the roller 33 and move it from its left or locked position to its right or unlocked position. The air cylinders 45 and 47, in the present instance, are mounted on a bracket 50 which is secured at 51 to the support 10.

Regardless of where the lock controlling means or air cylinders 45 and 47 are mounted, whether both at one station or at separate stations, suitable control means must be provided to bring about their operations at the intervals desired. If, as illustrated in FIG. 3, there are to be a plurality of heating stations where like heating units, according to the unit 38, are actuated to engage the molds at their respective stations, then it may be desirable to have only the air cylinder 45 at the first heating station and the air cylinder 47 at the last heating station with the intermediate stations provided solely with the other features of the apparatus including the heating unit 38 in each instance. However, to follow the present illustration with both air cylinders 45 and 47 located at one heating station, a very schematic means has been selected to illustrate an operating means for the air cylinders.

In this illustration, a double acting valve 55, responsive to solenoids 56 and 57, is provided for the air cylinder 45 and a double acting valve 58, responsive to solenoids 59 and 60, is adapted to control the air cylinder 47. The valves 55 and 58 are connected to an air line 61 provided with a pressure control valve 62 and a pump 63. Pins 68 and 69 mounted respectively in the ends of piston rods 46 and 48 serve to limit the inward movements of the piston rods.

The solenoids for the valves are responsive to a suitable or any commercially known electrical control 70, receiving its electrical energy from a supply 71 and responsive to a suitable starting means, such as that created by closing of a normally open switch 72 by a cam 73 mounted on the turret 21. The switch 72 is held closed by the cam 73 until it again indexes. This is to set up action in the electrical control so that in the present instance, the air cylinder 45 will operate moving its piston rod 46 to the right to engage the roller 32 and move the lock 28 into locking engagement with the pin 31 to secure the mold sections 22 and 22' into closed positions. Through a suitable timing means disposed in the electrical control, the valve 58 for the air cylinder 47 may be actuated to move the lock 28 into open position.

*Operation*

The heating unit 38, shown in FIG. 1, and if there is a plurality of heating units in spaced heating stations, as shown in FIG. 3, they are energized continuously so that as soon as they are moved into engagement with their mold sections 22 and 23, the mold sections will be heated thereby. The action of the carriage through the rollers 20 of the turret 21 is essential in positioning the heating unit free of the molds as they are moved into the heating station and also out of the heating station, due to the fact that the element 40 has a flat face to closely engage the flat adjacent faces of the mold sections and engage them for their full widths.

In the present illustration, after the switch 72 is closed to render the electrical control 70 effective, solenoid 57 is energized to move the valve 55 to cause air under pressure to force the piston, with its piston rod 46, to the right to move the lock 28 into closed position. After the outward movement of the piston rod 46, the solenoid 56 will be energized to return the valve 55 to its normal position, to return the piston of the air cylinder 45 and its piston rod 46 to the normal position shown.

Furthermore, a timing means, not shown, present in the control unit 70, would be preset according to the time of the rest interval of each mold in the heating station so that just prior to the expiration of this time interval, solenoid 60 will be energized to move the valve 58 to cause air cylinder 47 to operate moving its piston rod 48 to the right to engage the roller 33, to move the lock 28 into its open position. The moment the piston rod 48 reaches the end of its movement to the right, a circuit in the control unit 70 is closed to energize solenoid 59, to actuate the valve 58, to return the piston of the air cylinder 47 and its rod 48 to the normal positon shown.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for heating sectional molds having aligned faces, moved by a turret between intervals of rest into and out of a heating station and having locks movable to lock the sections of the molds closed and free the sections of the molds to open, the apparatus comprising:
   a support mounted at a fixed position adjacent the heating station,
   a carriage movably mounted on the support,
   a heating unit supported by the carriage and having a heating element with a face normally positioned to engage the aligned faces of the sections of successive molds and heat them,
   cam actuating detents movable with the turret, and
   a cam mounted on the carriage and responsive to the cam actuating detents adjacent the molds to move the carriage with the heating unit to move the face of the heating element away from the aligned faces of each mold moving out of the heating station and to free the carriage to move the heating unit to move the face of the heating element into engagement with the aligned faces of all the mold sections of each mold moved into the heating station.

2. An apparatus for heating sectional molds according to claim 1 in which:
   a bracket is mounted on the carriage,
   a rod slidably mounted on the bracket and fixed to the heating unit to movably support the heating unit on the carriage, and cushioning means interposed between the heating unit and the bracket to cause the face of the heating element to closely engage the aligned faces of the mold sections.

3. An apparatus for heating sectional molds according to claim 1 in which:
   a lock actuating unit is mounted on the support, and
   means to operate said unit as each mold enters the heating station to move its lock into locking position.

4. An apparatus for heating sectional molds according to claim 1 in which:
   a fluid operable cylinder is mounted on the support, and
   a piston rod for the cylinder adapted to engage the lock of each mold moved into the heating station to move the lock closed.

5. An apparatus for heating sectional molds according to claim 1 in which:
   a fluid operable cylinder is mounted on the support,
   a piston rod for the cylinder adapted to engage the lock of each mold moved into the heating station to move the lock closed,
   a switch operated at intervals by the turret, and
   electrical means responsive to the switch to cause operation of the fluid cylinder.

6. An apparatus for heating sectional molds according to claim 1 in which:
   a lock actuating unit is mounted on the support, and
   means to operate said unit subsequent to heating of the mold sections to free the sections of each mold to open by moving the lock thereof into unlocked position.

7. An apparatus for heating sectional molds according to claim 1 in which:
   a fluid operable cylinder is mounted on the support, and
   a piston rod for the cylinder adapted to engage the lock of each mold subsequent to the heating thereof to move the lock into unlocked position to free the mold section to open.

8. An apparatus for heating sectional molds according to claim 1 in which:
   a fluid operable cylinder is mounted on the support,
   a piston rod for the cylinder adapted to engage the lock of each mold subsequent to the heating thereof to move the lock into unlocked position to free the mold section to open,
   a switch operated at intervals by the turret, and
   electrical means responsive to the switch to cause operation of the fluid cylinder.

9. An apparatus for heating sectional molds according to claim 1 in which:
   fluid operable cylinders are mounted on the support, and
   piston rods for the cylinders respectively adapted to engage the lock of each mold at different intervals near the beginning and end of the heating of each mold to move each lock to lock its mold closed and to move each lock to free the mold sections to open.

10. An apparatus for heating sectional molds according to claim 1 in which:
    fluid operable cylinders are mounted on the support,
    piston rods for the cylinders respectively adapted to engage the lock at each mold at different intervals near the beginning and end of the heating of each mold to move each lock to lock its mold sections closed and to move each lock to free the mold sections to open,
    a switch operated at intervals by the turret, and electrical means responsive to the switch to cause operation of the fluid cylinders.

References Cited in the file of this patent

UNITED STATES PATENTS 2,581,977     Spalding et al. _____ Jan. 8, 1952
2,751,965     Miller _____ June 26, 1956